United States Patent [19]

Laule

[11] 4,145,198

[45] Mar. 20, 1979

[54] SINGLE TUBE HYDRO AIR FILTER WITH DIVIDING WALL

[75] Inventor: Thomas M. Laule, Sparks, Nev.

[73] Assignee: Parise & Sons, Inc., Reno, Nev.

[21] Appl. No.: 840,443

[22] Filed: Oct. 7, 1977

[51] Int. Cl.² .......................................... B01D 45/12
[52] U.S. Cl. ..................................... 55/439; 15/353; 55/250; 55/259; 55/260; 261/77; 261/123
[58] Field of Search .................. 55/240, 248, 250, 259, 55/260, 237, 439; 261/77, 123, DIG. 54; 15/320–322, 353

[56] References Cited

U.S. PATENT DOCUMENTS

| | | | |
|---|---|---|---|
| 2,913,234 | 11/1959 | Beavrline | 261/77 X |
| 3,130,024 | 4/1964 | Vaughan, Jr. | 55/248 X |
| 3,216,573 | 11/1965 | Irion | 261/123 X |
| 3,286,444 | 11/1966 | Boswinkle et al. | 55/259 X |
| 3,370,404 | 2/1968 | Leeper | 55/248 X |
| 3,896,521 | 7/1975 | Parise | 15/321 |
| 3,911,524 | 10/1975 | Parise | 15/353 |
| 4,078,908 | 3/1978 | Blackman | 55/237 |

FOREIGN PATENT DOCUMENTS

| | | | |
|---|---|---|---|
| 1278175 | 10/1961 | France | 55/248 |
| 1004690 | 9/1965 | United Kingdom | 55/248 |

*Primary Examiner*—Richard L. Chiesa
*Attorney, Agent, or Firm*—Sughrue, Rothwell, Mion, Zinn and Macpeak

[57] ABSTRACT

A hydro air filter for a dump bucket employed in a wet or dry vacuum system is formed by a single, vertical, closed tube with a transverse vertical dividing wall forming parallel vertical flow paths, the single tube having an opening at the top to one side of the dividing wall to sealably receive the dirty fluid return from the vacuum cleaner wand by way of an inlet tube which projects through the dump bucket side wall. The bottom of the dividing wall terminates short of the bottom of the tube to form a reduced cross-section, high-velocity flow area in proximity to one or more apertures within the tube, permitting aspiration of liquid within the dump bucket. The nozzles at the upper end of the single, closed tube open to the dump bucket interior to permit discharge of the return fluid and aspirated liquid for impingement on the inner wall of the dump bucket and separation of the liquid and gas components.

10 Claims, 2 Drawing Figures

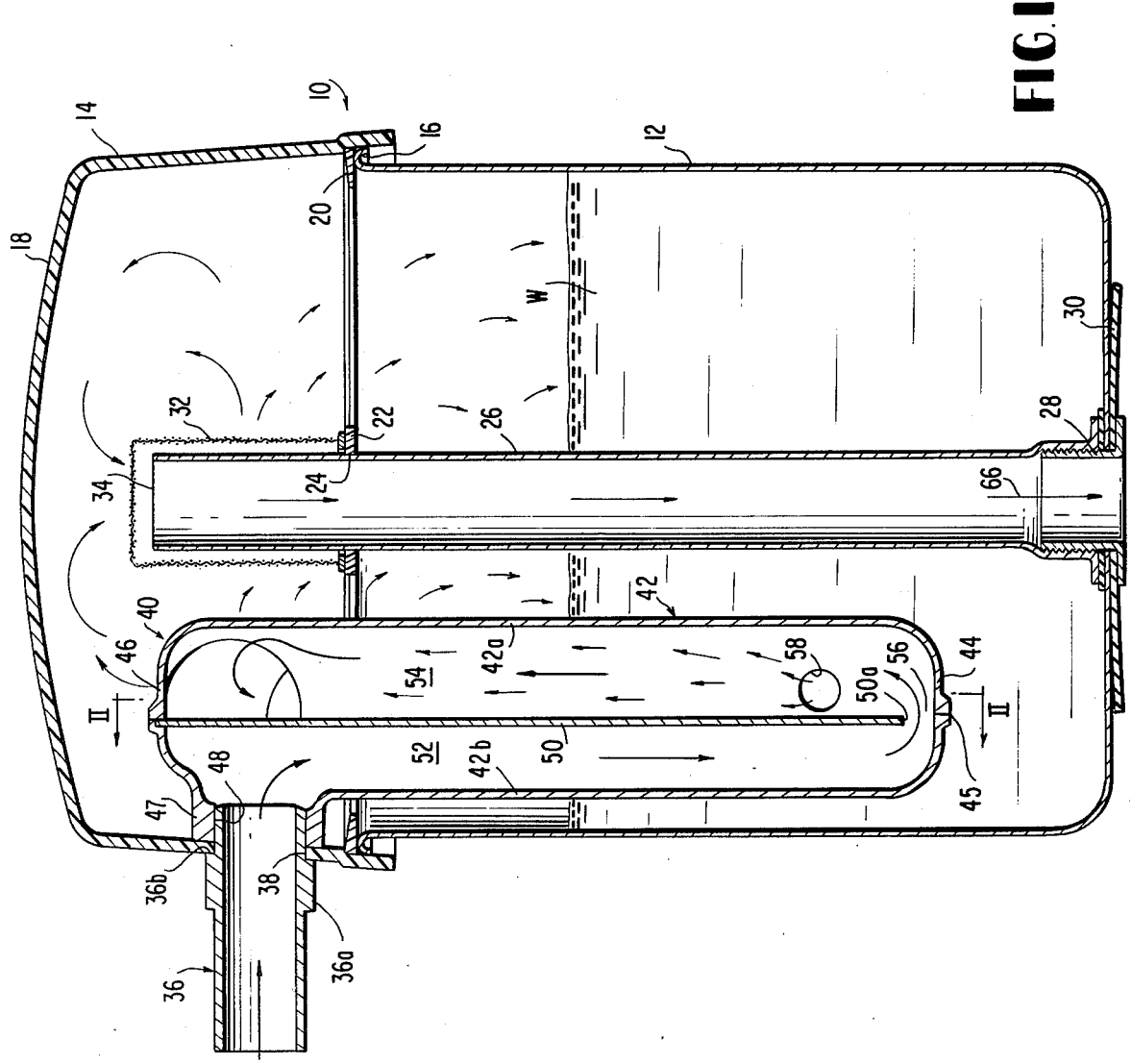

SINGLE TUBE HYDRO AIR FILTER WITH DIVIDING WALL

BACKGROUND OF THE INVENTION

Field of the Invention

This invention relates to vacuum cleaners, and particularly to hot water vacuum extraction cleaners of the type conventionally known as "steam cleaners."

Hot water, vacuum extraction cleaners for home use have come into recent vogue in which hot soapy water is discharged onto a carpet or other surface being cleaned from a cleaning head attached to one end of a wand constituting a hollow metal tube. Vacuum pressure is applied to the wand from the dump bucket to which the wand is connected by a flexible hose or the like to cause the hot water, or a combination of hot water and liquid cleaner, immediately previously sprayed on the carpet, to be picked up with foreign matter, such as dirt, lint, etc., with the dirty "return liquid" returned to the dump bucket for accumulation therein. Vacuum pressure is applied to the interior of the dump bucket, which constitutes a closed container, by applying vacuum to the lower end of a riser tube which extends upwardly normally through the center of the dump bucket and which terminates with its opening spaced slightly below the top of the closed dump bucket. Such hot water, vacuum extraction cleaner forms the subject matter of U.S. Pat. No. 3,896,521, entitled "Home Cleaning System," issuing July 29, 1975, and assigned to the common assignee.

To provide an effective filter for filtering out the dirt, lint, etc. picked up from the rug or other surface being cleaned, such machines have incorporated compact, vertical tube-type hydro air filters wherein the returning dirty fluid stream constituted principally by air entrained with the hot water and/or cleaning liquid from the carpet, and returning to the dump bucket by applied vacuum pressure internally of the dump bucket, or solely air and entrained dirt, lint and other particles when no hot water or liquid cleaner is sprayed by the spray nozzle attachment to the cleaning head, has its lower end submerged within water or other liquid which is either prefilled into the dump bucket or which constitutes the accumulated liquid portion of the return dirty fluid during normal cleaning operation. Apertures or openings are provided within the wall of the tube means adjacent a high-velocity flow point of the return fluid stream. This stream passes downwardly through one of two parallel flow paths and at or just after initiating upward flow through the second vertical flow path towards the top of the dump bucket, the flow aspirates liquid through the small apertures or openings within the tube means to cause the dirt, lint and dust particles to be entrained within the liquid portion of the stream which is then impact discharged against the inside wall of the dump bucket.

Such hydro air filter structural arrangements are found in copending applications Ser. No. 744,674, filed Nov. 24, 1976, to R. Eugene Blackman, entitled "Hydro Air Filter," and now U.S. Pat. No. 4,078,908 Ser. No. 744,675, filed Nov. 24, 1976, to Carl A. Parise, et al., entitled "Reverse Flow Hydro Air Filter For Wet/Dry Pickup System," and now U.S. Pat No. 4,083,705 both applications being assigned to the common corporate assignee.

Both of the above-identified patent applications are characterized by the tube means consisting of a pair of concentric tubes, the inner smaller diameter tube being connected at its upper end to an inlet tube which projects through the side of the dump bucket near the top, while the outer tube, which is fixed to the inner tube and concentrically surrounds the same and extends over the full length of the inner tube further projects axially to a point somewhat below the lower end of the inner tube and is covered at its bottom end. The bottom deflects the downwardly flowing return fluid into an annular space between the inner and outer tubes for further flow upwardly and discharge through an opening or openings provided within the upper end of the outer of the two tubes.

In one case, the lower end of the outer tube is closed off by a cup member having a cylindrical portion which resides within that annular space between the two tubes and which forms a very restricted annular flow path of short duration for the dirty return fluid, creating high-velocity return fluid flow at this point. Apertures within the side of the outer tube adjacent the cup member permit aspiration of the liquid accumulating within the dump bucket or purposely placed therein and being to a level above those apertures, such that the liquid entrained in the return dirty flow in turn entrains the particles of dirt, lint, dust, etc., and upon common discharge to the aperture through the opening or openings within the upper end of the outer of the two tubes and impingement against the inner wall of the dump bucket, entrainment of the dirt particles and the water occurs on the surface of the dump bucket, the return air separating therefrom and passing through the riser tube centrally positioned within the dump bucket to which the vacuum pressure is applied. In application Ser. No. 744,675, a single opening is provided within the outer tube at its very top and acts as a nozzle means for directing return fluid and aspirated liquid against the dome or top wall of the dump bucket. In application Ser. No. 744,674, the single opening and nozzle formed thereby is replaced by a spherical dome overlying the upper end of the outer tube and closing off that end of the outer tube. Further, short tubes projecting from opposite sides of the domed end of the outer tube form discharge nozzles which discharge the dirty return flow and the aspirated liquid, such as water, against the inner vertical wall of the dump bucket adjacent the dome top in two parallel and oppositely directed streams which effectively separate the liquid and entrained dirt particles from the air stream, the air then exiting through the riser tube. While the hydro air filters for the hot water, vacuum extraction cleaners operate satisfactorily and effectively filter the return dirty flow stream, whether the return flow is air plus entrained dirt or liquid and air plus entrained dirt, the construction of the hydro air filters to date are complicated and the cost necessarily increased by the utilization of concentric tubes.

It is therefore an object of the present invention to provide an effective, improved, low-cost hydro air filter for a hot water, vacuum extraction cleaner whose construction is simplified, which eliminates the necessity of dual concentric tubes and the necessity for an end cap and which materially reduces the cost of the composite filter structure.

SUMMARY OF THE INVENTION

The present invention is directed to an improved hydro air filter for a dump bucket employable in a vacuum cleaner and wherein the dump bucket comprises a closed cylindrical container having a side wall and top and bottom walls and acting to accumulate liquid therein and having its axis vertical. A hollow riser tube extends upwardly from the bottom of the container, is open at the bottom to the container exterior and has an open upper end which terminates short of the container top wall. The hydro air filter constitutes a single closed tube mounted within the container and extending vertically therein, being positioned between the container side wall and the riser tube. A vertical divider wall is carried internally within the single closed tube to separate the single closed tube into two separate vertical flow paths. The divider wall includes at least one opening within its lower end to effect a high-velocity fluid communication opening between said paths. The upper end of the single tube is connected to an inlet tube which inlet tube extends through the side wall of the container to permit dirty return flow to enter said one flow path at the upper end thereof. At least one aperture is provided within the single closed tube at its bottom end, in proximity to said at least one opening within said dividing wall and within said second flow path, for causing liquid within said dump tank container to be aspirated by the flow of return fluid within said second path. Said single closed tube comprises at least one nozzle at its upper end on the other side of said dividing wall from said fluid return tube to cause said return fluid and said aspirated liquid to impact against the container interior and to separate, by entrainment, the liquid and solid components thereof when vacuum pressure is applied to the hollow riser tube.

Preferably, the divider wall terminates with its lower end spaced from the bottom of the single closed tube to form a reduced cross-sectional flow area for the return fluid of relatively high velocity in proximity of said at least one aperture within said single closed tube. The single closed tube may include a single aperture vertically above the end of the dividing wall, within that portion of the tube forming the second parallel flow path. The single closed tube may constitute two semi-cylindrical sections joined along a vertical center line and with said dividing wall comprising a plate extending across the plane of juncture between the two semi-cylindrical tube sections. A pair of small diameter tubes may constitute opposed nozzles with said small diameter tubes being of semi-circular configuration and opening directly into said single closed tube to one side of said dividing wall, and wherein said dual nozzles are inclined with respect to the horizontal, to discharge entrained aspirated liquid and return fluid against the side wall of said closed container at points just above an annular shelf which separates the closed container into upper and lower cup-shaped members.

BRIEF DESCRIPTION OF THE DRAWINGS

FIG. 1 is a vertical sectional view of a dump bucket for a vacuum cleaner employing the improved, single tube hydro air filter forming one embodiment of the present invention.

FIG. 2 is a vertical section of the single tube hydro air filter taken about line II—II of FIG. 1.

DESCRIPTION OF THE PREFERRED EMBODIMENT

The dump bucket to which the hydro air filter of the present invention is applied in the figures is indicated generally at 10, and is a modification of the dump bucket 34 of U.S. Pat. No. 3,896,521, also assigned to the common assignee. The dump bucket comprises a closed container, in this case, consisting of a lower cup-shaped member 12 and an upper cup-shaped member 14, the lower cup-shaped member terminating at its upper end in a flange 16 which is directed radially outwardly — that is, away from the interior of the dump bucket. The upper cup-shaped member is provided with a dome-shaped top 18. An annular shelf 20 projects radially inward from the inner periphery of that member adjacent its lower, open end which rests upon the flange 16. The shelf 20 includes an integral strut 22 which extends diametrically across the inside of the dump bucket and which is apertured at 24 to receive the upper end of a cylindrical riser tube 26, the riser tube 26 being fixed at its bottom to an annular fitting 28 which sealably mounts the riser tube 26 to the bottom wall 30 of the lower cup-shaped member 12. The annular member 28 acts as an extension of the riser tube and opens to the exterior of the dump bucket. The strut 22 may support a perforated filter screen 32 which overlies the open, upper end 34 of the riser tube 26 to effectively screen off lint particles and the like attempting to escape from the interior of the dump bucket upon the application of vacuum pressure by a vacuum pump (now shown) which pressure is applied to the lower end of the riser tube 26. The application of vacuum pressure to the interior of the dump bucket causes the annular shelf 20 to seat against the flange 16 to seal the interior of the dump bucket — that is, effect an air-tight seal between the lower and upper cup-shaped members 12 and 14, respectively.

Conventionally, a "return fluid" inlet tube or return tube indicated generally at 36 is mounted to the upper cup-shaped member 14 by having a portion projecting through a cylindrical opening 38 within the side of the upper cup-shaped member, above the annular shelf 20. The inlet tube 36 is preferably formed with an enlarged diameter portion 36a, which defines a shoulder 36b, which abuts the exterior of the upper cup-shaped member adjacent aperture 38 and facilitates the connection of the hydro air filter indicated generally at 40 to the inlet tube 36.

In the illustrated embodiment, the present invention is characterized by a single closed tube indicated generally at 42, having its lower end closed by a transverse bottom wall 44, and its upper end closed by an upper transverse wall 46. Preferably, the single tube which is circular in horizontal cross-section comprises two semi-cylindrical halves, a first half 42a and a second half 42b which are joined about a vertical center plane by being welded as at 45. Further, in the construction of the single tube hydro air filter, a vertical divider wall or plate 50 is welded to the semi-cylindrical tube sections or halves 42a and 42b at their junctions, to separate the single tube 42 into parallel flow paths or passages, a first flow path 52 within half 42b and a second vertical flow path 54 within tube section or half 42a. The tube half 42b is integrally provided at its upper end in a right angle nipple or sleeve 47 defining a circular opening 48 which receives the portion of the inlet tube 36 projecting inwardly of the upper cup-shaped member 14. The tube half 42b is mounted to the fluid inlet tube and sealably secured thereto at the nipple 46. This permits the return flow of dirty fluid which may be air with entrained dirt, lint, etc. from the carpet being cleaned by way of a wand (not shown) connected to the inlet tube 36 exterior of the dump bucket 10, or air and entrained dirt and liquid when a water and/or a cleaning agent is being applied to the carpet or other surface being cleaned.

The hydro air filter 40 is constructed such that the dividing wall or plate 50 extends completely to the top of the single tube 42. However, its lower edge 50a terminates short of the bottom transverse wall 44 of tube 42, defining a reduced cross-section flow area 56 between the transverse bottom wall 44 and the lower edge 50a of the dividing wall or plate 50. Further, the right-hand tube section or half 42a is provided with a pair of small diameter apertures or openings 58 within the side of the tube half 42a above the lower edge 50a of the divider plate 50, such that the return fluid passing downwardly through passage 42 and moving at high velocity through the restricted area 56 induces water to aspirate through the apertures 58 and enter the flow stream acting to entrain the dust, dirt and lint particles as the return flow and aspirated liquid moves upwardly, as indicated by the larger arrows within flow path or passage 54. The entrained liquid which may be purposely added to the dump tank 10 or which may be accumulated dirty water and/or cleaning liquid returning from the carpet or other surface being cleaned and which accumulates within the tank, after reaching the level of the apertures 58, is aspirated into that air or air and liquid stream, as evidenced by the smaller arrows. While the transverse wall or plate 46 closes off the upper end of the single, closed tube 42, the hydro air filter 40 further comprises integral wings 50b of the divider wall or plate 50 and the tube half extensions as at 42a' being welded at both edges to the wings 50b to form nozzles indicated generally at 60. The tube half extensions 42a' are semi-cylindric in configuration. The nozzles 60 are provided, therefore, with open ends 62 which direct the air and the liquid, as evidenced by the large and small arrows, respectively, against the inside wall of the upper cup-shaped member 14 above the shelf 20, the liquid along with its entrained dirt, dust and lint particles being entrained by the wall upon contact, while the air, separated at this point, seeks outlet from the dump tank through the open end 34 of the riser tube 26 back to the cleaner vacuum pump (not shown) in the direction of the large arrow 66 at the lower end of the riser tube 26. The water, as evidenced by the small arrows, passes over the shelf 20 which acts as a baffle by reducing the velocity of the water as it seeks by gravity, the lower cup-shaped member 12 for accumulation within that tank. While the reduced cross-sectional area passage between the flow paths 52 and 54 is formed by termination of the vertical divider wall or plate 50 short of the lower wall 44 of the single hydro air filter tube 40, the divider plate may extend the full length of the tube 40 and may be provided with one or more apertures within the same to effect that reduced cross-section of the return flow path and induce a high velocity at the point where the air crosses apertures 58 to effect aspiration of the liquid into this high-velocity flow. Further, the dump bucket incorporating the improved single tube hydro air filter of the present invention may be used for either wet or dry vacuuming, and when used with a hot water vacuum extraction unit of the type shown in U.S. Pat. No. 3,896,521, it may employ the dirty return water as the self-operating filter liquid. Further, while the nozzles 60 are shown as projecting to diametrically opposite sides of the container interior and are angled slightly downwardly from the horizontal to project the liquid and the air against the side of the upper cup-shaped member just above shelf 20, various modifications and changes may be made without departing from the spirit and scope of the present invention.

The invention, therefore, is to be measured by the claims appended hereto, and not by the foregoing preferred embodiment.

What is claimed is:

1. In a dump bucket for a vacuum cleaner, said dump bucket comprising:
   a cylindrical, closed container having a bottom wall, a top wall and a side wall, and acting to accumulate liquid therein and having its axis extending vertically;
   an open hollow riser tube extending upwardly from the bottom of the container and being open at the bottom to the container exterior and terminating short of the container top wall;
   a hollow fluid return tube projecting through a wall of the container near its top, a hydro air filter mounted to said fluid return tube within said container, extending vertically therein and comprising separate, adjacent parallel vertical first downwardly and second upwardly flow paths, and being in fluid communication with said return tube, said flow paths being in fluid communication with each other at the bottom of said hydro air filter, and at least one aperture within the bottom of said hydro air filter and opening to the interior of said container, and nozle means at the top of said hydro air filter fluid communicating the upper end of the second flow path with the interior of the container, such that liquid within the container at a level above said at least one aperture is aspirated by return fluid entering the inlet tube as the return fluid moves upwardly within the section flow path to cause a mixture of the return fluid and the liquid entering said aperture to be discharged through the nozzle means for impact against the container interior and to separate by entrainment of the liquid components thereof when vacuum pressure is applied to the hollow riser tube at the bottom of the dump bucket container, such that under vacuum pressure, the return fluid causes the liquid within the container to enter the stream of return fluid to effect filtering of the return fluid stream, the improvement wherein said hydro air filter comprises a single closed tube, a vertical divider wall plate is carried internally within said single closed tube and spanning across said tube to separate said single, closed tube into said two vertical flow paths, and means defining an opening within the lower end of said plate to effect fluid communication between said paths at the bottom of said single closed tube, said fluid return tube connects through a wall of said single tube means to one side of said plate at the top of said single, closed tube, said at least one aperture is provided within the wall of said single, closed tube on the side of said plate defining said second flow path and said nozzle means comprises at least one nozzle mounted to said single closed tube at the upper end thereof and opening into said second flow path.

2. The dump bucket as claimed in claim 1 wherein said plate terminates with its lower end spaced from the bottom of said single closed tube to form said at least opening of reduced cross-sectional area between said first and second flow paths.

3. The dump bucket as claimed in claim 2 wherein said at least one aperture is formed within the side of said single, closed tube at a vertical position above the lower end of said plate.

4. The dump bucket as claimed in claim 1, wherein said single, closed tube comprises face-to-face abutting cylinder halves and said plate sealably separates said cylinder halves into said two flow paths and spans across the open ends of both cylinder halves and mechanically couples the cylinder halves together.

5. The dump bucket as claimed in claim 2, wherein said single closed tube comprises face-to-face abutting cylinder halves and said plate spans across the open ends of both cylinder halves and mechanically couples the cylinder halves together.

6. The dump bucket as claimed in claim 3, wherein said single closed tube comprises face-to-face abutting cylinder halves and said plate spans across the open ends of both cylinder halves and mechanically couples the cylinder halves together.

7. The dump bucket as claimed in claim 4 wherein said nozzle comprises diametrically opposite projections of said cylinder halves, and said plate includes integral wings sealably connected to the edges of said cylinder half projections.

8. The dump bucket as claimed in claim 6 wherein said nozzle comprises diametrically opposite projections of said cylinder halves, and said plate includes integral wings sealably connected to the edges of said cylinder half projections.

9. The dump bucket as claimed in claim 7 wherein said cylinder half projections and said wings are inclined relative to the horizontal so as to direct return fluid and entrained liquid and aspirated liquid radially outwardly and downwardly against the inside of the upper cup-shaped member above the annular shelf.

10. The dump bucket as claimed in claim 7 wherein said cylinder half projections and said wings are inclined relative to the horizontal so as to direct return fluid and entrained liquid and aspirated liquid radially outwardly and downwardly against the inside of the upper cup-shaped member above the annular shelf.

* * * * *